UNITED STATES PATENT OFFICE.

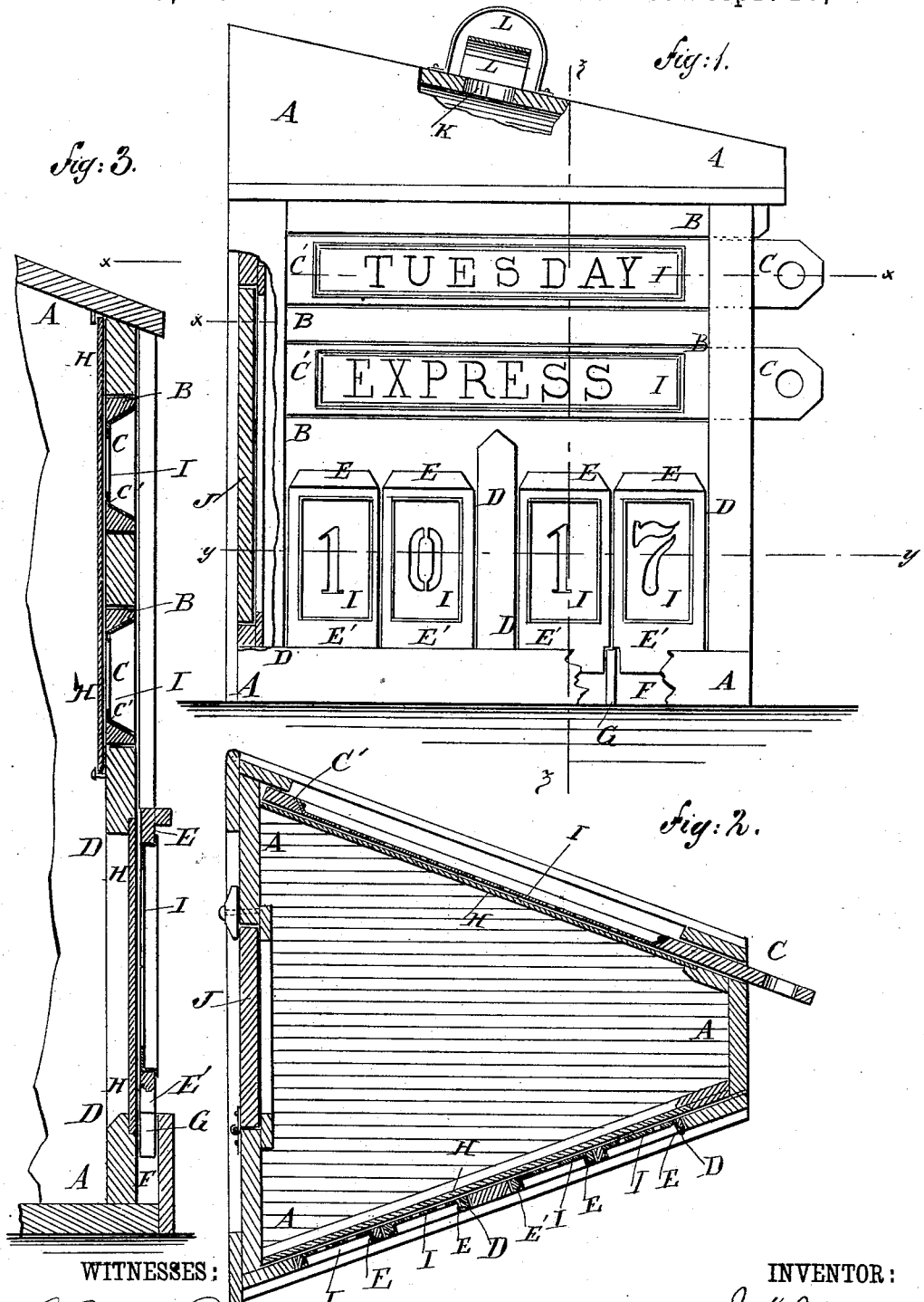

JAMES H. DUMONT, OF NEW YORK, N. Y.

RAILROAD-EXPRESS INDICATOR.

SPECIFICATION forming part of Letters Patent No. 275,609, dated April 10, 1883.

Application filed December 27, 1882. (No model.)

*To all whom it may concern:*

Be it known that I, JAMES H. DUMONT, of the city, county, and State of New York, have invented a new and useful Improvement in Railroad-Express Indicators, of which the following is a full, clear, and exact description.

Reference is to be had to the accompanying drawings, forming a part of this specification, in which similar letters of reference indicate corresponding parts in all the figures.

Figure 1 is a side elevation of my improvement, parts being broken away. Fig. 2 is a sectional plan view of the same, taken through the line $x\ x$ on one side and the line $y\ y$ upon the other side. Fig. 3 is a sectional elevation of a part of the same, taken through the line $z\ z$, Fig. 1.

The object of this invention is to promote convenience and efficiency in the use of railroad-express indicators.

The invention further consists in the slides made with wooden frames having iron plates secured in them, the said iron plates having perforations in the form of letters and figures formed through them, whereby the said slides will be strengthened against breakage should they accidentally fall, as will be hereinafter fully described.

A represents a railroad-express indicator, which is triangular in form, with the forward angle truncated, as shown in Fig. 2. In the upper part of the sides of the case A are formed slots B, into which are fitted horizontal slides C, the said slides passing through guide-openings in the frame of the case A, and being made sufficiently long for the ends of the said slides to project and serve as handles in removing and inserting them. In the lower part of the sides of the case A are formed openings D, which are covered on the outer side by vertical slides E. The lower ends of the slides E are inserted in openings F in the lower part of the frame of the case A, and are rabbeted to form shoulders to rest upon stops G and prevent the said slides from going down too far. The openings B D are closed by plates H, of glass or other suitable transparent material, secured to the sides of the case A, and the slides C E are formed of wooden frames C' E', having iron plates I secured in them, the letters or figures expressing the information to be given being formed as openings in the said iron plates. By this construction the slides will not be liable to be broken should they accidentally fall. With this construction the light of a lamp placed within the case A will shine through the plates I of the slides C E, making the letters and figures formed through the said slides distinctly visible by night and day, and the glass plates H, secured on the inside of the slide, will prevent wind and rain from entering the case and extinguishing the light. With this construction, also, the heat from the lamp will warm the case, so that snow and sleet will not freeze upon the slides and cover the openings through them.

In the rear side of the case A is formed a door, J, for convenience in inserting and removing the lamp.

The gaseous products of combustion escape through an opening, K, in the top of the case, which opening is covered with V-plates L, placed at right angles with each other, as shown in Fig. 1, or with any suitable cap so formed as to exclude wind and rain, while allowing the products of combustion to escape freely. Among the advantages of this invention it may be mentioned that one lamp will do the work that heretofore required two lamps. Another advantage is that the lamp is so placed that the light will fall directly upon the transparent surfaces, and thus produce a better illumination than when the light falls upon the signs at an angle, as heretofore practiced.

I am aware that it is not new to make a triangular express-signal with the signs, notations, or names cut in rows on the sides, and with a removable cover over each sign; but

What I claim as new and of my invention is—

A railroad-express indicator consisting of the triangular case A, having horizontal and vertical slides C E, formed of metal plates I, having perforated characters through them, and secured in wooden frames C' E', the vertical slides having shoulders adapted to rest on stops G, and glass plates H, secured behind the slides, as described and shown, for the purpose set forth.

JAMES H. DUMONT.

Witnesses:
JAMES T. GRAHAM,
C. SEDGWICK.